(12) United States Patent
Tsuboi (10) Patent No.: US 8,539,595 B2
(45) Date of Patent: Sep. 17, 2013

(54) INFORMATION PROCESSING APPARATUS, INFORMATION PROCESSING METHOD AND PROGRAM, AND STORAGE MEDIUM STORING THE SAME

(75) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/719,514

(22) Filed: Mar. 8, 2010

(65) Prior Publication Data

US 2010/0242117 A1  Sep. 23, 2010

(30) Foreign Application Priority Data

Mar. 10, 2009 (JP) ................ 2009-056365

(51) Int. Cl.
*G06F 21/00* (2013.01)
*G06F 17/30* (2006.01)
*H04N 7/16* (2011.01)
*G06F 21/10* (2013.01)
*G06Q 30/06* (2012.01)

(52) U.S. Cl.
CPC .......... *G06F 21/10* (2013.01); *G06Q 30/06* (2013.01)
USPC ............... 726/26; 726/27; 726/28; 726/29; 726/30; 705/51; 705/52; 705/59

(58) Field of Classification Search
USPC ............... 726/26–30; 705/51, 52, 59
See application file for complete search history.

(56) References Cited

U.S. PATENT DOCUMENTS

| | | | | |
|---|---|---|---|---|
| 6,957,186 B1 * | 10/2005 | Guheen et al. | ............ | 705/323 |
| 7,409,463 B2 * | 8/2008 | Ramachandran | ............ | 709/246 |
| 7,590,600 B2 * | 9/2009 | Bovee et al. | ............ | 705/59 |
| 7,757,937 B2 * | 7/2010 | Akiba | ............ | 235/375 |
| 7,890,950 B1 * | 2/2011 | Nanavati et al. | ............ | 717/174 |
| 7,900,246 B1 * | 3/2011 | Xu et al. | ............ | 726/9 |
| 8,090,660 B2 * | 1/2012 | Solomon et al. | ............ | 705/52 |
| 2003/0191958 A1 * | 10/2003 | Gartside et al. | ............ | 713/200 |
| 2004/0133448 A1 * | 7/2004 | Higashi et al. | ............ | 705/1 |
| 2004/0249762 A1 * | 12/2004 | Garibay et al. | ............ | 705/59 |
| 2005/0049973 A1 * | 3/2005 | Read et al. | ............ | 705/59 |
| 2005/0132347 A1 * | 6/2005 | Harper et al. | ............ | 717/168 |
| 2006/0106727 A1 * | 5/2006 | Yellai et al. | ............ | 705/59 |
| 2006/0184932 A1 * | 8/2006 | Burnley et al. | ............ | 717/174 |
| 2006/0294019 A1 * | 12/2006 | Dayan et al. | ............ | 705/59 |
| 2007/0150417 A1 * | 6/2007 | Hu | ............ | 705/59 |
| 2008/0209569 A1 * | 8/2008 | Araki | ............ | 726/26 |
| 2008/0271162 A1 * | 10/2008 | Fujimura | ............ | 726/29 |

(Continued)

FOREIGN PATENT DOCUMENTS

JP  2006-217320 A  8/2006

*Primary Examiner* — Catherine Thiaw (74) *Attorney, Agent, or Firm* — Canon USA Inc IP Division (57) ABSTRACT

An information processing apparatus in which a part of a plurality of different programs included in an application package is validated includes an invalidation command input unit configured to input a command to invalidate a license of the application package, a generation unit configured to generate invalidation verification data by invalidating the license of the program which is included in the application package, is already installed in the information processing apparatus, and has a validated license, and to generate invalidation verification data of the license of the program without installing the program which is included in the application package and is not installed in the information processing apparatus, and an output unit configured to output the invalidation verification data generated by the generation unit.

6 Claims, 10 Drawing Sheets

(56) References Cited

U.S. PATENT DOCUMENTS

| | | | |
|---|---|---|---|
| 2009/0024984 A1* | 1/2009 | Maeda | 717/121 |
| 2009/0080013 A1* | 3/2009 | Sato et al. | 358/1.15 |
| 2009/0122356 A1* | 5/2009 | Mihira | 358/402 |
| 2009/0235363 A1* | 9/2009 | Tomita | 726/27 |
| 2010/0057674 A1* | 3/2010 | O'Donnell | 707/3 |
| 2011/0061102 A1* | 3/2011 | Aono et al. | 726/21 |
| 2011/0162079 A1* | 6/2011 | Amimoto | 726/26 |

\* cited by examiner

INFORMATION PROCESSING APPARATUS, INFORMATION PROCESSING METHOD AND PROGRAM, AND STORAGE MEDIUM STORING THE SAME

BACKGROUND OF THE INVENTION

1. Field of the Invention

The present invention relates to an information processing apparatus, an information processing method, and program associated with license management, and in particular, to license transfer between apparatuses.

2. Description of the Related Art

An example of a device connected to a network is a device capable of installing an application with a license. There is a system that includes a license information issuing server for issuing a license (hereinbelow referred to as an issuing server) connected to the network. In the system, the issuing server performs processing for transferring the application and its license from a device to another device without impropriety. For example, Japanese Patent Application Laid-Open No. 2006-217320 discusses cooperation between an issuing server located on a network and a device connected to the network to install an application with a license.

SUMMARY OF THE INVENTION

According to an aspect of the present invention, an information processing apparatus in which a part of a plurality of different programs included in an application package is validated includes an invalidation command input unit configured to input a command to invalidate a license of the application package, a generation unit configured to generate invalidation verification data by invalidating the license of the program which is included in the application package, is already installed in the information processing apparatus, and has a validated license, and to generate invalidation verification data of the license of the program without installing the program which is included in the application package and is not installed in the information processing apparatus, and an output unit configured to output the invalidation verification data generated by the generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the accompanying drawings.

A license management system, a license management method and a license management program according to an exemplary embodiment of the present invention will be described in detail below with reference to the accompanying drawings. Components illustrated in the present exemplary embodiment of the present invention are merely examples and are not intended to limit the scope of the present invention.

Figure 1:
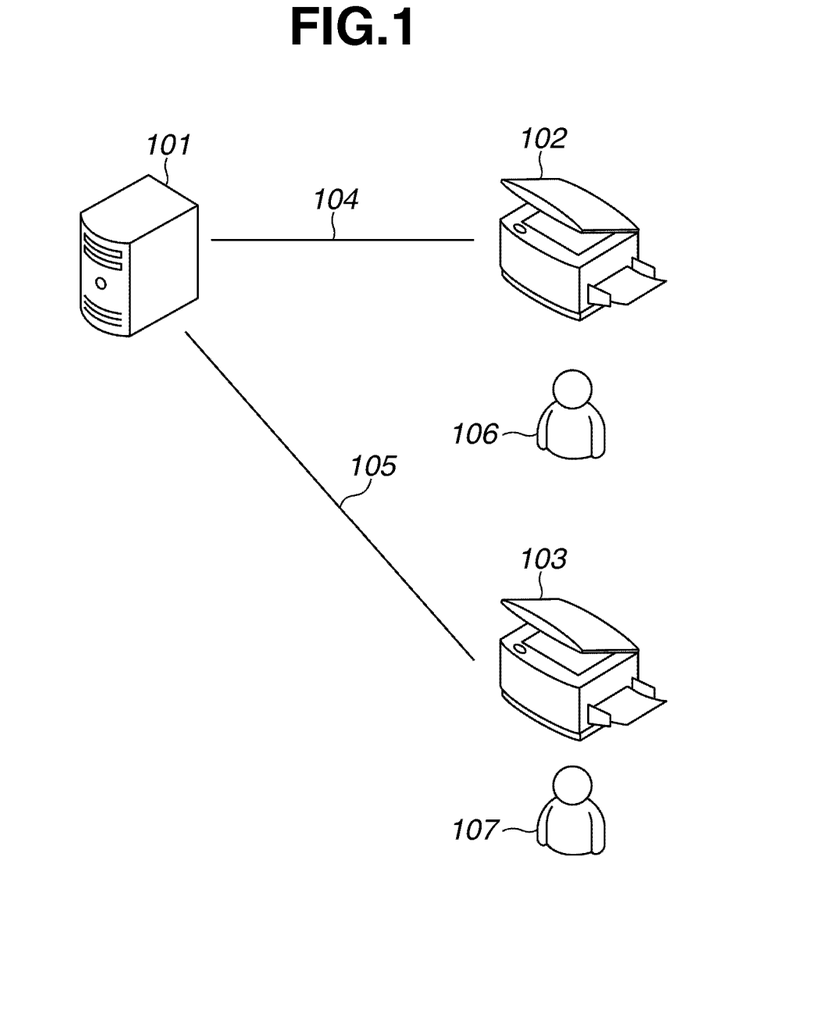
FIG. 1 illustrates a system configuration diagram according to an exemplary embodiment of the present invention together with FIGS. 2 to 10.

FIG. 1 illustrates a configuration of a network system which includes an information processing apparatus according to the exemplary embodiment of the present invention. The present exemplary embodiment illustrates the configuration in which an issuing server 101 and two information processing apparatuses (i.e., a first information processing apparatus and a second information processing apparatus), for example, multifunction peripherals (MFPs) 102 and 103 are connected by networks.

The issuing server 101 is an information processing apparatus (i.e., a license management apparatus) that manages overall processing of issuing license information. Various function units are configured by a computer system of the issuing server 101. Examples of the function units include a server access unit, a device number request unit, a device number detection unit, a license issuing confirmation request unit, and a device number check unit. Other examples of the units include a license key (LKey) issuing unit, an option information registration unit, an identifier generation unit, and an identifier transmission unit.

Each of the MFPs 102 and 103 is capable of installing a plurality of applications and license information and has a unique device ID (i.e., identification information).

In the present exemplary embodiment, the MFP 102 is an MFP of an application and license transfer source. The MFP 103 is an MFP of an application and license transfer destination. Networks 104 and 105 represent computer networks such as Internet, and the MFP 102 is connected via the network 104 to the issuing server 101. In addition, the MFP 103 is connected via the network 105 to the issuing server 101.

An operator 106 operates the MFP 102 and selects a transfer target application on the MFP 102 when an application with a license is transferred. An operator 107 operates the MFP 103 and installs the application with the license transferred from the MFP 102 in the MFP 103.

In the exemplary embodiments of the present invention, the operators 106 and 107 may be different persons or the same person.

Figure 2:
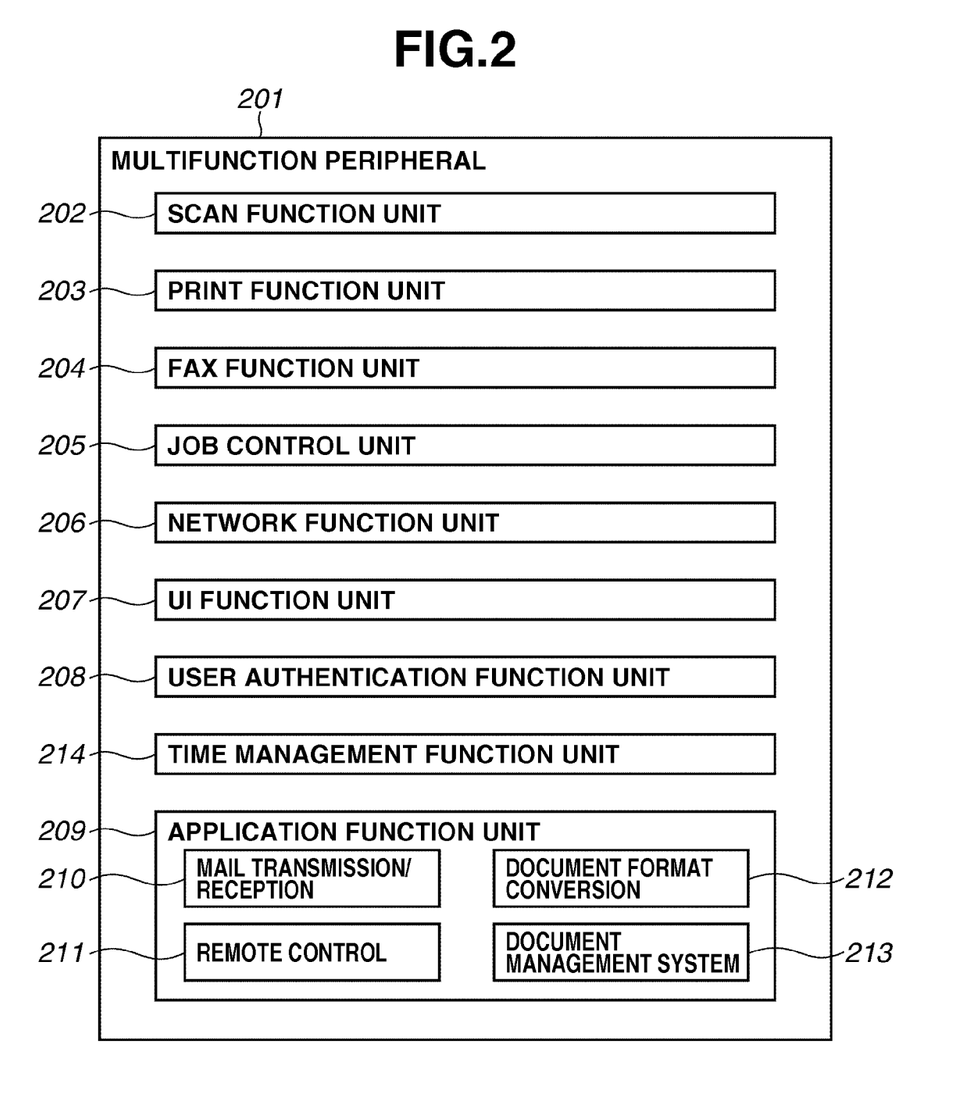
FIG. 2 is a functional block diagram of a multifunction peripheral according to an exemplary embodiment of the present invention.

The information processing apparatus configuring the system will be described below in detail. FIG. 2 is a block diagram of a multifunction peripheral that illustrates an example of a device according to the present exemplary embodiment of the present invention. A multifunction peripheral 201 includes various function units 202 to 209.

A scanner function unit 202 includes a function of reading a paper document and a function of converting to binary image data. A print function unit 203 includes a function of adding a command for a printer to an image which is read and converted to the binary image data by the scanner function unit 202, and outputting the result to a printer device. A facsimile function unit 204 performs an encoding operation, based on facsimile standards such as G3 and G4, on the image which is read and converted to the binary image data by the scanner function unit 202. Further, the facsimile function unit 204 includes a function of performing image communication with an external facsimile device according to a protocol based on the facsimile standards. Further, the facsimile function unit 204 includes a function of transmitting and receiving facsimile images to and from an external facsimile device according to the facsimile standards.

A job control function unit 205 queues the binary image data which is received from the scanner function unit 202, and the facsimile image data which is received from the external facsimile device by the facsimile function unit 204, as a print job. Further, the job control function unit 205 includes a job control function that sequentially outputs appropriate data to the print function unit 203, the facsimile function unit 204, and a network function unit 206 that will be described below in detail.

The network function unit 206 includes various network protocol functions such as Transmission Control Protocol/Internet Protocol (TCP/IP), Hyper Text Transfer Protocol (HTTP), File Transfer Protocol (FTP), Lightweight Directory Access Protocol (LDAP), Simple Network Management Protocol (SNMP), Simple Mail Transfer Protocol (SMTP), and Secure Sockets Layer (SSL).

A user interface (UI) function unit 207 manages input/output by a user using an operation panel of the multifunction peripheral 201, and displays an input field and an output message field on the operation panel. The UI function unit 207 includes a function of receiving an input value for the input field from the user and notifying other function units of the input value. Further, the UI function unit 207 includes a function of displaying a message for the user from the other function units in a pre-designed display screen.

A user authentication function unit 208 uses the UI function unit 207 or an information terminal (not illustrated) on the network to respond to a user authentication requests of various applications in an application function unit 209 that will be described below in detail. More specifically, the user authentication function unit 208 uses a user authentication setting file to set various user authentication functions to each application. Further, the user authentication function unit 208 includes a function of authenticating a user who operates various functions of the multifunction peripheral using a user authentication server on the network or user authentication information in the multifunction peripheral.

The application function unit 209 includes a function of installing, user-authenticating, executing and uninstalling various applications that operate in the multifunction peripheral 201. The application function unit 209 sets an effective period of an application when the application is installed. Further, the application function unit 209 uses a time management function unit 214, which will be described below in detail, at the execution of the application to determine the effective period of the application preset at the installation thereof, so that the application with the effective period is implemented.

Expiration date information may be stored in an object of the application to set the effective period of the application. In addition, the effective period information may be set as additional information at the installation of the application and may be set as a separate object.

The effective period may be represented by the number of days from the installation of the application till the application will be inoperative. The effective period may be the number of days which represents a valid period or may be an expiry date indicating "until what month/day/year". Even in the case of using the expiry date, the number of days representing the effective period can be calculated from an internal system clock of the multifunction peripheral 201. The valid period may be defined in the unit that is more specific than the number of days. For example, the valid period may be defined in the unit of seconds. Even in this case, the valid period can be calculated if it is within a range of the time unit according to the internal system clock. Information representing the effective period is provided as a factor in an installation time setting function at the installation of the application and is stored in a nonvolatile memory region of the multifunction peripheral 201.

Among the applications in the MFP, an application whose main body is already installed, the function of the application may be validated by installation of only a license key. After the installation of the application, a validation sequence is necessary to use the application on the MFP. In general, a license key input from the UI function unit 207 is used to validate the application. The license key includes a function classification and validation device ID (identification information). Further, input of the license key may be performed via the network using the network function unit 206.

Application validation processing is executed by input of the license key into the MFP. More specifically, a license bit present in the nonvolatile memory region of the MFP corresponding to each application is turned on to have a value of '1'. The license bit may be turned off to invalidate the application.

A group of applications 210 to 213 which operate on the application function unit 209 of the multifunction peripheral 201 will be described below. For example, the application function unit 209 includes a mail application 210, a remote control application 211, a document format conversion application 212, and a document management system application 213.

The mail application 210 uses the network function unit 206 to receive an e-mail with an electronic document from an information terminal on the network, and uses the print function unit 203 to print the received e-mail. Further, the mail application 210 attaches an electronic document which is read by the scanner function unit 202 to an e-mail and transmits the e-mail to a predetermined destination.

The remote control application 211 uses the UI function unit 207 to display a user interface screen which is identical to a main body touch panel displayed in a multifunction peripheral main body on an information terminal (not illustrated) connected to the network. Accordingly, remote control can be implemented. Hereinbelow, the user interface is abbreviated as a UI and the user interface screen is referred to as a UI screen.

The document format conversion application 212 includes a function of converting data into a predetermined electronic data format. Examples of the data to be converted include electronic data read by the scanner function unit 202, and electronic data transmitted from an information terminal on the network and received by the network function unit 206.

The document management system application 213 includes a function of storing a file or data in a predetermined document storage area in the multifunction peripheral main body or on the network. Examples of data to be stored include electronic data read by the scanner function unit 202 according to an operation of the multifunction peripheral by the operator, and electronic data transmitted from the information terminal on the network and received by the network function unit 206.

User authentication may be performed on the applications 210 to 213. To any one of the applications 210 to 213, user authentication is performed by the user authentication unit 208 via the application function unit 209 when the operator uses the corresponding application.

The time management function unit 214 is provided to manage the clock information of the system. The time management function unit 214 includes an internal system clock and provides time setting and referential internal system clock interfaces for all of the function modules of the multifunction peripheral 201. The time management function unit 214 includes a function of storing accumulative setting differential time from the system start in a nonvolatile memory region such as a flash read only memory (ROM).

Further, the time management function unit 214 includes a function of time synchronization using a time synchronization service on the network to which the multifunction peripheral 201 is connected. Examples of the time synchronization service include protocol-based time synchronization services prescribed by, for example, TIME protocol (RFC868), network time protocol (NTP) protocol (RFC1305) or simple network time protocol (SNTP) protocol (RFC1769). Further, the time management function unit 214 includes an install time setting function for application installation to determine the effective period of an application with an effective period.

Figure 3:
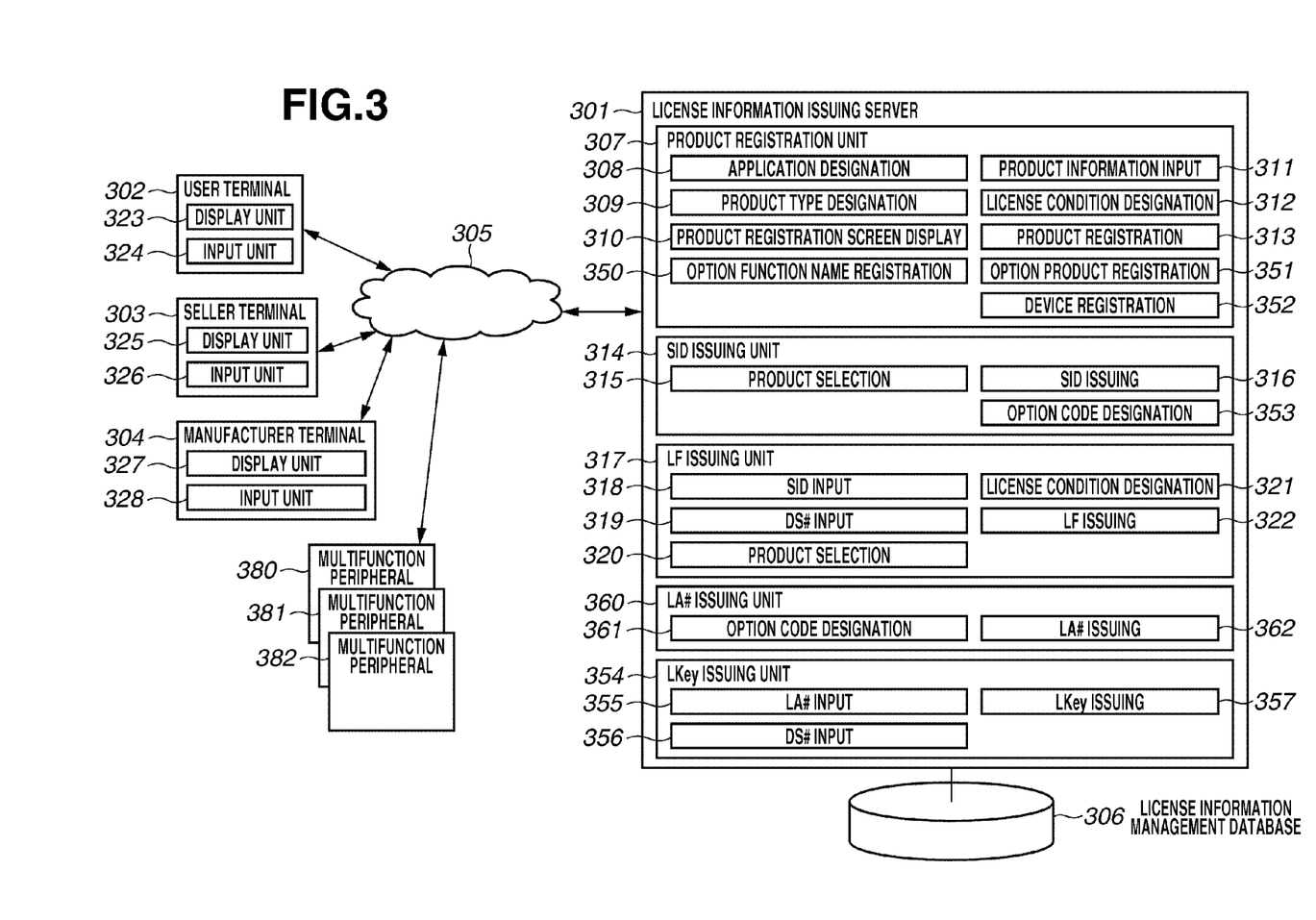
FIG. 3 is a block diagram illustrating an issuing server and each terminal device according to an exemplary embodiment of the present invention.

Hereinbelow, the issuing server which serves as an information processing apparatus that manages overall processing for issuing license information will be described in detail with reference to FIG. 3. Referring to FIG. 3, an issuing server 301, a user terminal 302, a seller terminal 303, a manufacturer terminal 304, and multifunction peripherals 380 to 382 are communicably connected via a network 305. The issuing server 301 of FIG. 3 corresponds to the issuing server 101 of FIG. 1.

The issuing server 301 includes various function units that are configured using a central processing unit (CPU) and programs that are interpreted and executed by the CPU, which will be described below in detail.

The user terminal 302 is an information processing apparatus managed by the user. The user terminal 302 includes a display unit 323 and an input unit 324. The user terminal 302 may be any information processing apparatus (e.g., a personal computer (PC), a portable terminal, a printer, and a copier) that is connectable to the network and is capable of installing an application. In the present exemplary embodiment according to the present invention, a server access unit, a device number transmission unit and a license information confirmation unit are configured by a computer system of the user terminal 302.

The seller terminal 303 is an information processing apparatus that is managed by a selling company. The seller terminal 303 includes a display unit 325 and an input unit 326. The manufacturer terminal 304 is an information processing apparatus that is managed by a software developer (a manufacturer). The manufacturer terminal 304 includes a display unit 327 and an input unit 328. For example, the seller terminal 303 or the manufacturer terminal 304 may be a PC or a work station.

The user terminal 302, the seller terminal 303 and the manufacturer 304 are communicably connected via the network 305 to the issuing server 301.

The multifunction peripherals 380 to 382 operate various applications by installing a license that is issued from the issuing server 301. The multifunction peripherals 380 to 382 communicate with the user terminal 302 via the network 305. Each function unit of FIG. 2, a license management unit, and a Web application unit are configured by a computer system that is provided in the multifunction peripherals 380, 381 and 382.

A license information management database (DB) 306 is connected to the issuing server 301. For example, application information, product information including license information, actor information, software identification code (hereinbelow referred to as SID) information, device serial number (hereinbelow referred to as DS#) information, device product information, and device number data band information are stored in the license information management DB 306. Further, application ID, device product code associating information, option product information, license access number (hereinbelow referred to as LA#) information, license key (hereinbelow referred to as LKey) information, option information, and customer information are stored in the license information management DB 306.

A product registration unit 307, an SID issuing unit 314, a license file (LF) issuing unit 317, an LA# issuing unit 360, and an LKey issuing unit 354 which are main units of the issuing server 301 will be described below in detail.

The product registration unit 307 includes an application designation module 308, a product type designation module 309, a product registration display module 310, a product information input module 311, and a license condition designation module 312. The product registration unit 307 further includes a product registration module 313, an option function name registration module 350, an option product registration module 351, and a device registration module 352.

The SID issuing unit 314 is configured to perform an SID issuing process. The SID issuing unit 314 includes a product selection module 315, an SID issuing module 316, and an option code designation module 353.

The LF issuing unit 317 includes an SID input module 318, a DS# input module 319, a product selection module 320, a license condition designation module 321, and an LF issuing module 322.

The LA# issuing unit 360 is configured to issue a license access number LA#. An option code designation module 361 is provided to designate an option for issuing a license access number LA#, and an LA# issuing module 362 is provided to input a desired number to issue a license access number LA#.

The license key (LKey) issuing unit 354 includes an LA# input module 355, a DS# input module 36, and an LKey issuing module 357.

License information issued by the issuing server 301 is necessary to install the software managed by the system in the information processing apparatus managed by the user. If there is a proper access via the network 305, the issuing server 301 issues necessary license information. The license information may include unique identification information of the information processing apparatus for the installation destination of the software. In this case, other license information is necessary to install the same software in other device. In other words, if there is no license information including unique identification information in other information processing apparatus, the software cannot be installed. Accordingly, unauthorized duplication of the software can be prevented.

Hereinbelow, license transfer in the present exemplary embodiment will be described in detail. FIGS. 4A to 4C and FIGS. 5A to 5C illustrate an example of a UI display screen in the MFP 102 that is the transfer source of a license or an application.

The license transfer starts from invalidation of all licenses for the applications of an integrated product installed in the transfer source MFP 102. More specifically, the MFP 102 includes an invalidation unit that invalidates a licensed application.

Figure 4A:
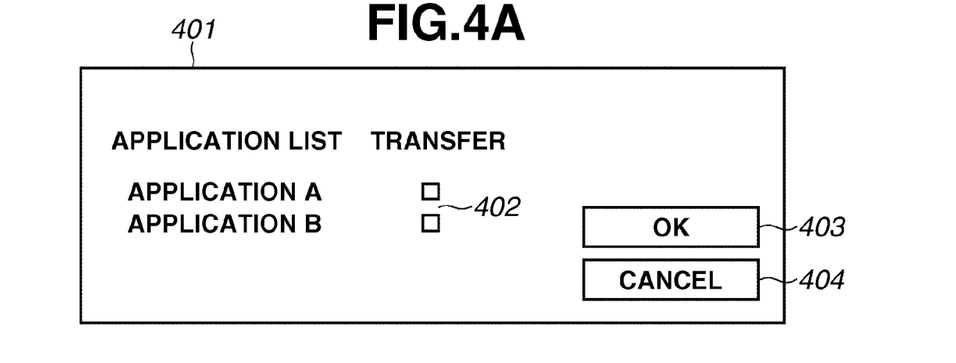
FIG. 4A illustrates an example of a user interface (UI) display screen when application invalidation processing is started in a multifunction peripheral.

FIG. 4A illustrates an example of a UI display screen for invalidating the license of the transfer source MFP 102. A UI display screen 401 for license invalidation is displayed by the UI function unit 207 in the transfer source MFP 102.

The operator 106 uses the UI function unit 207 of the transfer source MFP 102 to select an application desired to be transferred. In the present exemplary embodiment, a check box 402 in the UI display screen 401 may be used to select the application. Thereafter, the operator 106 operates an OK button 403 to select the application desired to be transferred, among the applications installed in the transfer source MFP 102. Further, the operator 106 may operate a cancel button 404 to cancel application transfer processing.

Figure 4B:
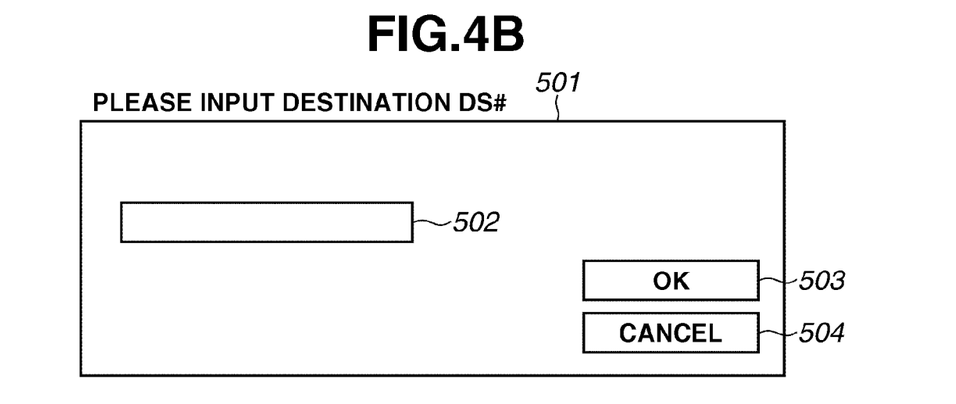
FIG. 4B illustrates an example of a UI display screen for designation of a transfer destination.

FIG. 4B illustrates an example of a UI display screen 501 for inputting the DS# of a transfer destination. The operator 106 inputs the DS# of a transfer destination in an input frame 502. Thereafter, the operator 106 operates an OK button 503 to select a device of the transfer destination. Further, the operator 106 may operate a cancel button 504 to cancel the application transfer processing.

Figure 4C:
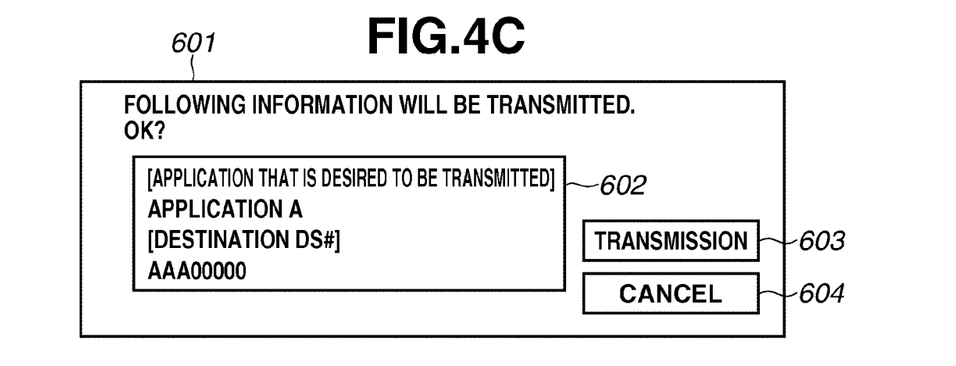
FIG. 4C illustrates an example of a UI display screen for confirmation in transfer.

FIG. 4C illustrates an example of a UI display screen 601 for confirming the items input into the UI display screens 401 and 501. The operator 106 confirms the information displayed in an input frame 602, i.e., the application name selected in the UI display screen 401 and the transfer destination DS# input in the UI display screen 501. Thereafter, the operator 106 operates an OK button 603 to transmit input information to the issuing server 101. Further, the operator 106 may operate a cancel button 604 to cancel the application transfer processing.

On the issuing server, an integrated product including an application is searched and specified based on the information transmitted from the UI display screen 601 to the issuing server 101. Then, a file (i.e., an invalidation command file) for commanding the invalidation of all applications included in the integrated product is generated, and the generated file is transmitted to the transfer source MFP 102. In other words, the issuing server 101 includes an issuing unit of an invalidation command file and uses the invalidation command file to command the MFP 102 to invalidate the application.

Figure 8A:
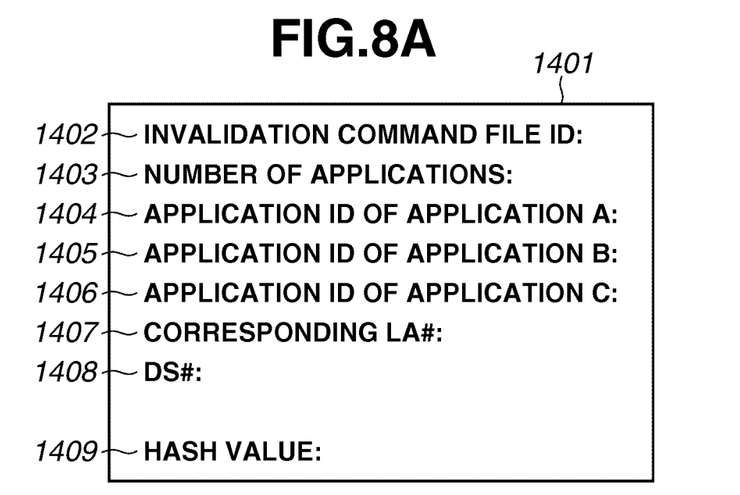
FIG. 8A illustrates an example of an invalidation command file.

FIG. 8A illustrates an example of a structure of an invalidation command file 1401 according to the present exemplary embodiment according to the present invention. For example, the invalidation command file 1401 includes the following information.

An invalidation command file ID 1402 for uniquely specifying the invalidation command file 1401

The number 1403 of applications included in an integrated product

Application IDs 1404, 1405 and 1406 that are identification information of the applications included in the integrated product A corresponding LA# 1407

A DS# 1408 of a device that is an invalidation target of the application

A hash value 1409 generated from information represented by the information elements 1402 to 1408

Further, a common key may be used to encrypt the invalidation command file 1401 to conceal the contents of the field.

Figure 5A:
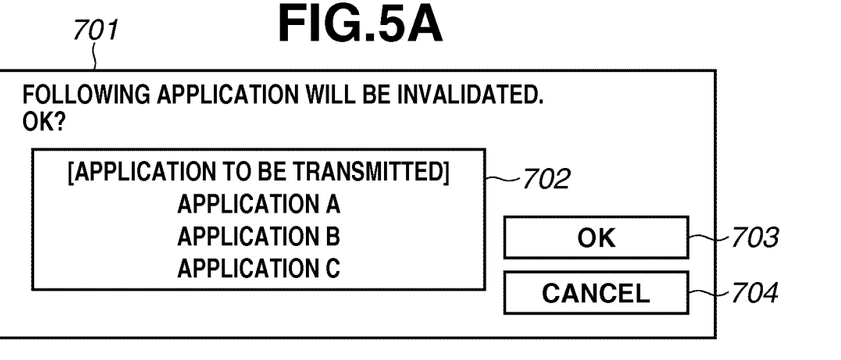
FIG. 5A illustrates an example of a UI display screen for confirmation of application invalidation processing in a multifunction peripheral.

FIG. 5A illustrates an example of a UI display screen 701 when the invalidation command file 1401 is received from the issuing server 101. A list of applications to be transferred is displayed at a display frame 702. The operator 106 operates an OK button 703 to select a device of the transfer source. Further, the operator 106 may operate a cancel button 704 to cancel the application transfer processing.

Figure 5B:
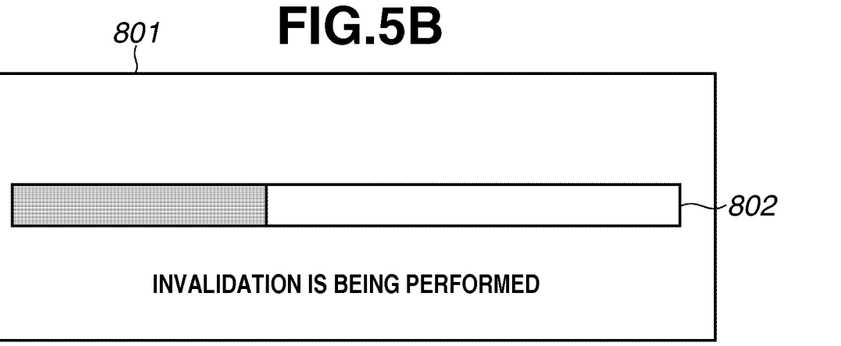
FIG. 5B illustrates an example of a UI display screen during the invalidation processing.

FIG. 5b illustrates an example of a UI display screen 801 displayed during the execution of invalidation processing. The progress state of the invalidation processing is displayed by a bar graph 802.

Figure 5C:
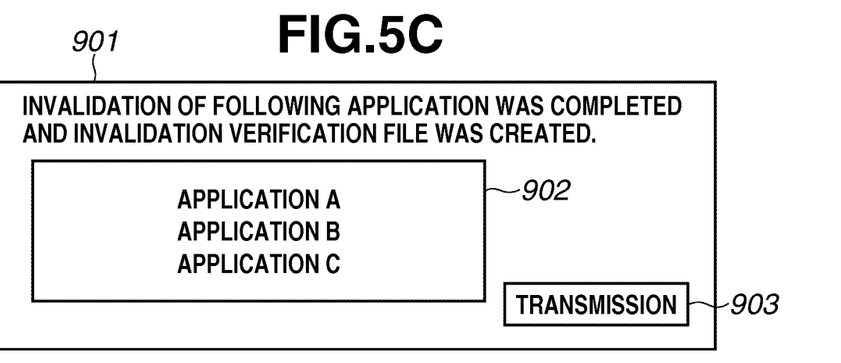
FIG. 5C illustrates an example of a UI display screen at the completion of the invalidation process.

FIG. 5C illustrates an example of a confirmation UI display screen 901 that is displayed after completing the invalidation processing and creating an invalidation verification file.

A list of invalidated applications is displayed at a display frame 902. The operator 106 operates a transmission button 903 to transmit an invalidation verification file 1501 to the issuing server 101. Further, the invalidation verification file 1501 is a file that verifies the invalidation of the application based on the invalidation command file 1401 received from the MFP 102.

Further, since the invalidation processing of the application in the UI display screen 901 is already completed, the application transfer processing cannot be canceled at this point.

Figure 8B:
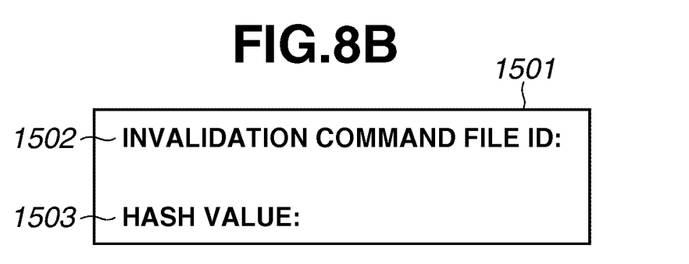
FIG. 8B illustrates an example of an invalidation verification file.

FIG. 8B illustrates an example of the invalidation verification file 1501 according to the present exemplary embodiment according to the present invention. The invalidation verification file 1501 includes an invalidation command file ID 1502 (corresponding to the invalidation verification file 1402 of FIG. 8A) which is identification information for uniquely specifying the invalidation command file 1401 and a hash value 1503 generated from the invalidation command file ID 1502. Further, a common key may be used to encrypt the validation verification file to conceal the contents of the field.

The issuing server 101 receives the invalidation verification file 1501 transmitted by the operation of the transmission button 903 illustrated in FIG. 5C, and the transfer source MFP 102 confirms the invalidation of all the applications in the integrated product. Then, the issuing server 101 issues a license for the transfer destination DA# input at the input frame 502 of FIG. 4B.

Figure 6A:
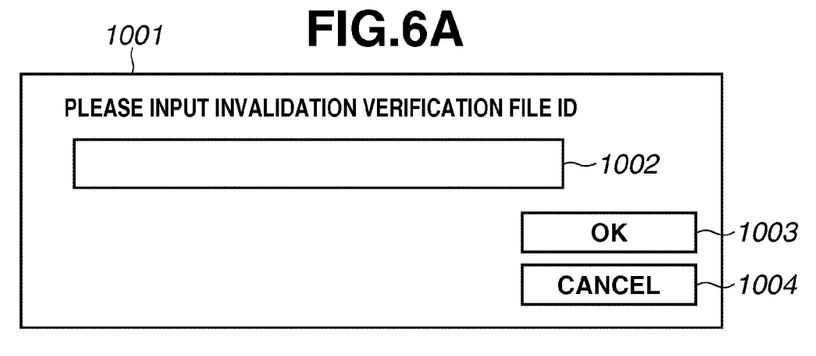
FIG. 6A illustrates an example of a UI display screen for designation of an integrated product at application transfer in a multifunction peripheral.

FIG. 6A illustrates an example of a UI display screen 1001 for installing the application invalidated by the transfer source MFP 102 in the transfer destination MFP 103. The operator 107 inputs an invalidation command file ID at an input frame 1002. Then, the operator 107 operates an OK button 1003 to transmit the input information to the issuing server 101. Further, the operator 107 may operate a cancel button 1004 to cancel application installation processing.

Figure 6B:
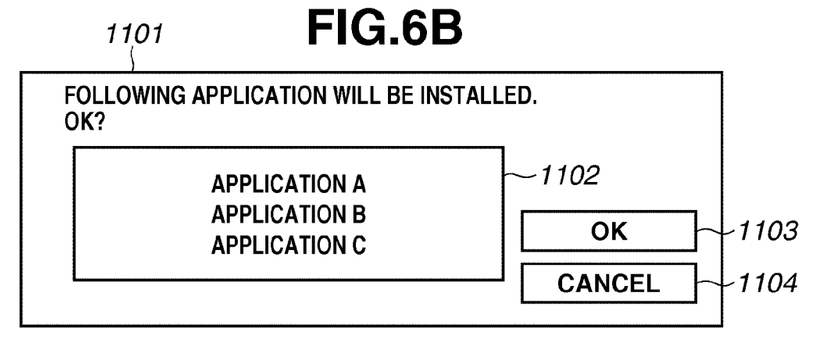
FIG. 6B illustrates an example of a confirmation UI display screen.

FIG. 6B illustrates an example of a UI display screen 1101 that displays a list of applications that are installed based on the information received from the issuing server 101. A list of the applications to be installed is displayed at a display frame 1102. The operator 107 operates an OK button 1103 to start the installation processing. Further, the operator 107 may operate a cancel button 1104 to cancel the application installation processing.

Figure 6C:
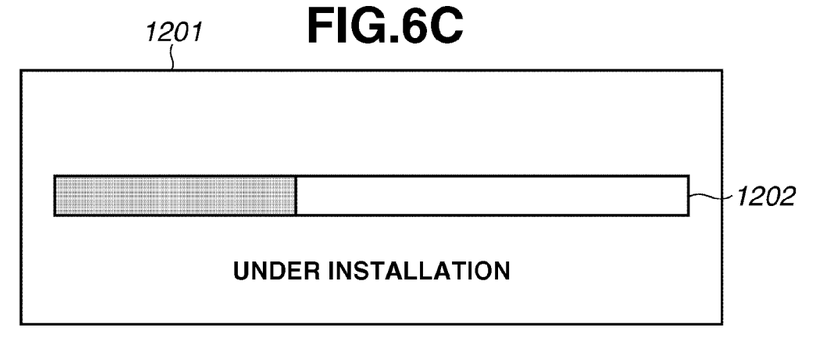
FIG. 6C illustrates an example of a UI display screen during installation.

FIG. 6C illustrates an example of a UI display screen 1201 displayed during the application installation processing. A progress sate of the installation is displayed by a bar graph 1202.

Figure 7:
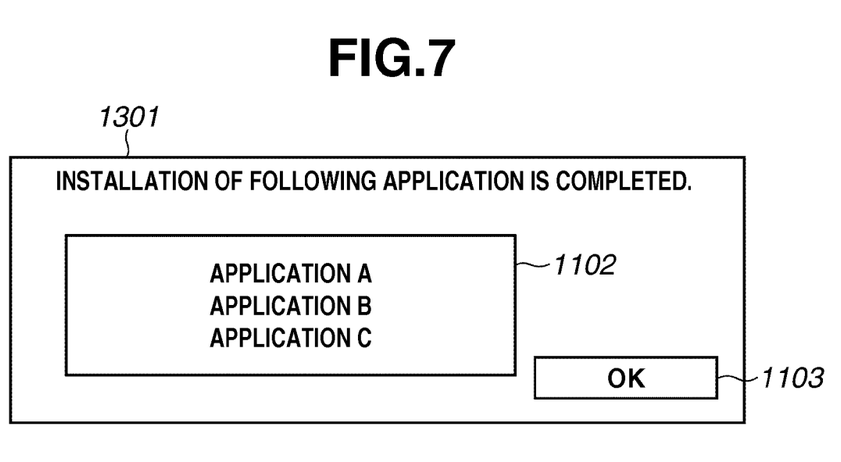
FIG. 7 illustrates an example of a UI display screen for confirmation of the completion of installation in a multifunction peripheral.

FIG. 7 illustrates an example of a UI display screen 1301 that displays a list of installed applications. A list of the installed applications is displayed at a display frame 1302. The operator 107 may operate an OK button 1103 to confirm the completion of the installation processing. The transfer destination MFP 103 includes a validation unit for validating an application based on the license information transferred from the issuing server 101. Thus, the operator 107 may initiate and operate the installed application.

Figure 9:
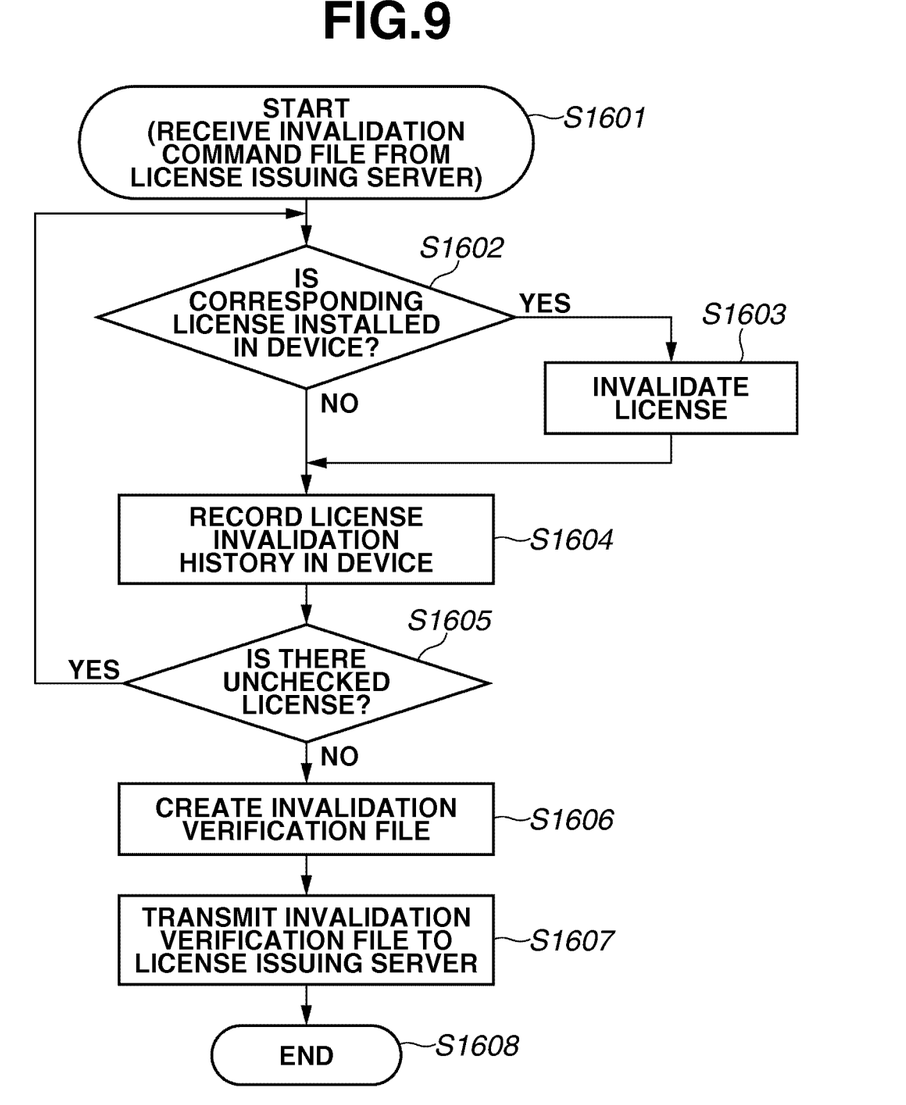
FIG. 9 is a flow chart illustrating processing in a device according to an exemplary embodiment of the present invention.

FIG. 9 is a flow chart illustrating a processing flow in the device. In step S1601, the invalidation command file is received from the license information issuing server to start the processing. Unless otherwise stated, the following processing is executed by the LKey issuing unit 354 of the license issuing server.

In step S1602, the LKey issuing unit 354 checks whether the corresponding license is installed in the device. If the license is installed (YES in step S1602), in step S1603, the license is invalidated, and then in step S1604, the license invalidation history is recorded in the device. If the license is not installed (No in step S1602), then in step S1604, the license invalidation history is recorded in the device without installing the license.

Then, in step S1605, the LKey issuing unit 354 checks whether there is any unchecked license. If there is an unchecked license (YES in step S1605), the processing returns to step S1602. If there is no unchecked license (NO in step S1605), then in step S1606 the LKey issuing unit 354 creates an invalidation verification file.

In step S1607, the LKey issuing unit 354 transmits the invalidation verification file to the license information issuing server. Then, in step S1608, the processing is ended. Accordingly, the license transfer can be accelerated by omitting the license installation processing sequence.

In the above, the license information issuing server 301 is described as an example of the information processing apparatus in which a part of a plurality types of the programs included in the application package is validated. The input unit 35 is described as an example of the invalidation command input unit that inputs the command for invalidating the license of the application package. Further, it is described that the generation unit invalidates the license of a program which is included in the application package, already installed in the multifunction peripheral, and validated its license, and generates the invalidation verification data. Furthermore, it is described that the LKey issuing unit 354 generates the invalidation verification data of a license of a program which is included in the application package and not installed in the multifunction peripheral (an example of the information processing apparatus) without installing the program.

The LKey issuing unit 354 may output the generated invalidation verification data to the network or a file. Further, the LKey issuing unit 354 may record the invalidation verification data every time the verification data is generated.

In response to the invalidation of the license of all the programs included in the application package, the LKey issuing unit 354 may record the invalidation results, generate invalidation verification data, and output the invalidation verification data. The LKey issuing unit 354 may record, as the invalidation result, the history indicating that a program which is included in the application package is deleted even if the program is not installed in the multifunction peripheral.

A modification of the exemplary embodiment of the present invention will be described below in detail. In the above exemplary embodiment, the invalidation command file and the invalidation verification file are used for the license transfer. In the modification, general license information used for application installation is used instead of the invalidation command file of FIG. 9. Unless otherwise stated, the following processing is executed by the LKey issuing unit 354.

Figure 10:
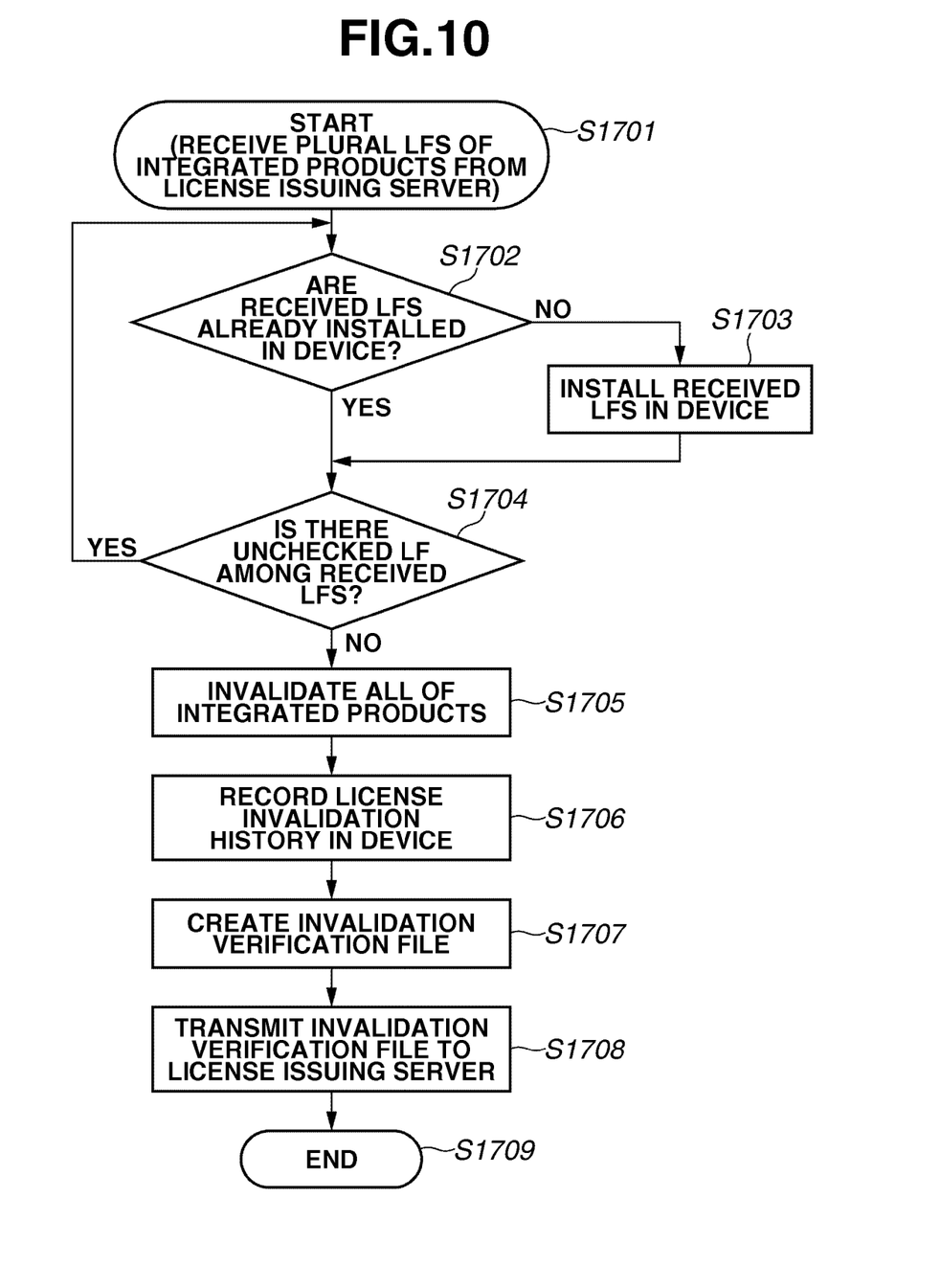
FIG. 10 is a flow chart illustrating processing in a device according to a modification of the present invention.

FIG. 10 is a flow chart illustrating a processing flow in the device. In step S1701, the LKey issuing unit 354 starts the processing when a plurality of LFs of an integrated product is received from the license information issuing server.

In step S1702, the LKey issuing unit 354 checks whether the LF received from the license information issuing server is already installed in the device. If the received LF is not already installed in the device (NO in step S1702), then in step S1703, the received LF is automatically installed even if there is no explicit command of the user.

On the other hand, if the received LF is already installed in the device (YES in step S1702), then in step S1704, the LKey issuing unit 354 checks whether there is any unchecked LF among the received LFs. If there is an unchecked LF among the received LFs (YES in step S1704), the processing returns to step S1702.

On the other hand, if there is no unchecked LF among the received LFs (NO in step S1704), then in step S1705, all the licenses of the integrated product are invalidated, and in step S1706, the license invalidation history is recorded in the device.

In step S1707, an invalidation verification file is generated, and in step S1708, the invalidation verification file is transmitted to the license information issuing server. Then in step S1709, the processing is ended.

In the above modification, the sequence increases by one because the installation processing is performed in addition to the above exemplary embodiment. However, step S1703 is automatically performed without the user's command, thus the sequence of the license transfer by the user can be efficiently performed.

According to the above described system, an application and the license thereof can be transferred from a device to another device without impropriety. In this case, while the conventional system is targeted on a single application, the system according to the present invention is targeted on the transfer of all the applications of the integrated product in the transfer source device. Further, the system according to the present invention can implement the application transfer for the communication information exchanged between the issuing server and each device, without a problem even in poor communication conditions. Particularly, in the transfer of a plurality of applications, while the conventional system based on an individual transfer unit increases the trouble by the number of transfers, the system according to the present invention does not cause such an adverse effect.

According to the present exemplary embodiment of the present invention, in the transfer of all the applications in a multifunction peripheral (MFP), all the applications included in the integrated product do not need to be individually transferred. Further, in the individual application transfer unit, secure un-installation of applications in the transfer source and installation of the applications in the transfer destination do not need. Therefore, a relatively complex sequence accompanied by the exchange of the license file or the access to the issuing server becomes unnecessary. Accordingly, since the individual transfer processing for all the applications in the MFP does not need to be performed several times, it is possible to reduce the trouble and time taken to transfer all the applications in the MFP to another MFP.

Another method for transferring all the applications from the MFP to the other MFP, the transfer may be performed by a unit for copying all the data from the transfer source to the transfer destination, instead of the conventional individual transfer unit. However, the simple copy cannot securely reflect the transfer state to the database of the issuing server.

The integrated product that is an example of the application package including a plurality of programs may include the application which is not used in the target device. It is necessary to prevent the installation of the application or the license which are not installed in the target device after the transfer thereof. Therefore, it is necessary to permit a start of use of the application package in the transfer destination after confirming the invalidation of all the programs included in the application package of the transfer source. If there are applications which are not installed in the transfer processing, a unit for recording a deletion history by invalidating the applications after installing the applications which are not installed may be provided. The application is an example of the program. However, the sequence is very complex.

According to the exemplary embodiments of the present invention, the transfer sequence of the license of the application package including a plurality of programs can be simplified. For example, the license of the application package can be transferred to another device even if the transfer source does not install and/or validate all of the plurality types of programs included therein.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-056365 filed Mar. 10, 2009, which is hereby incorporated by reference herein in its entirety.

What is claimed is:

1. An information processing apparatus in which a part of a plurality of different programs included in an application package is validated, the information processing apparatus comprising:
   at least a processor;
   a memory storing instructions that, when executed by the at least processor, cause the information processing apparatus to:
   transmit information of an application input by a user to a server;
   receive, from the server, an invalidation command file corresponding to an application package including the application corresponding to the information input by the user, wherein the invalidation command file includes a number of applications included in the application package and identification information of each of the applications;
   input a command to invalidate a license of the application package;
   invalidate, based on the invalidation command file, a license of a program which is included in the application package, is already installed in the information processing apparatus, and has a validated license;
   record a first history indicating that the license of the program which is included in the application package and is already installed in the information processing apparatus is invalidated;
   record, without installing a program which is included in the application package and is not installed in the information processing apparatus, a second history indicating that a license of the program which is included in the application package and is not installed in the information processing apparatus is invalidated;
   generate invalidation verification data based on the first and second recorded history; and
   output the generated invalidation verification data to the server.

2. The information processing apparatus according to claim 1, wherein the server permits a start of use of the application package in a transfer destination after confirming the invalidation of all the programs included in the application package of the information processing apparatus as a transfer source.

3. A method for processing information executed by an information processing apparatus in which a part of a plurality of different programs included in an application package is validated, the method using the following:
   at least a processor;
   a memory storing instruction that, when executed by the at least processor, cause the information processing apparatus to perform the following methods of:
   transmitting information of an application input by a user to a server;
   receiving, from the server, an invalidation command file corresponding to an application package including the application corresponding to the information input by the user, wherein the invalidation command file includes a number of applications included in the application package and identification information of each of the applications;
   inputting a command to invalidate a license of the application package;
   invalidating, based on the invalidation command file, a license of a program which is included in the application package, is already installed in the information processing apparatus, and has a validated license;
   recording a first history indicating that the license of the program which is included in the application package and is already installed in the information processing apparatus is invalidated;
   recording, without installing a program which is included in the application package and is not installed in the information processing apparatus, a second history indicating that a license of the program which is included in the application package and is not installed in the information processing apparatus is invalidated;
generating invalidation verification data based on the first and second recorded history; and
outputting the generated invalidation verification data to the server.

4. The method according to 3, further comprising recording the invalidation verification data every time the invalidation verification data is generated.

5. The method according to 3, further comprising:
recording an invalidation result in response to the invalidation of the license of all the programs included in the application package;
generating the invalidation verification data; and
outputting the invalidation verification data.

6. A non-transitory computer-readable storage medium storing a control program for causing a computer to execute an information processing method for an information processing apparatus in which a part of a plurality of different programs included in an application package is validated, the method comprising:
transmitting information of an application input by a user to a server;
receiving, from the server, an invalidation command file corresponding to an application package including the application corresponding to the information input by the user, wherein the invalidation command file includes a number of applications included in the application package and identification information of each of the applications;
inputting a command to invalidate a license of the application package;
invalidating, based on the invalidation command file, a license of a program which is included in the application package, is already installed in the information processing apparatus, and has a validated license;
recording a first history indicating that the license of the program which is included in the application package and is already installed in the information processing apparatus is invalidated;
recording, without installing a program which is included in the application package and is not installed in the information processing apparatus, a second history indicating that a license of the program which is included in the application package and is not installed in the information processing apparatus is invalidated;
generating invalidation verification data based on the first and second recorded history; and
outputting the generated invalidation verification data to the server.

* * * * *